| United States Patent [19] | [11] | 4,222,898 |
|---|---|---|
| Noltes et al. | [45] | Sep. 16, 1980 |

[54] ZERO-VALENT MIXED METAL CATALYSTS AND PROCESS OF PREPARATION

[75] Inventors: Jan G. Noltes, Huis Ter Heide; J. T. B. H. Jastrzebski, De Bilt; Gerard van Koten, Bilthoven, all of Netherlands

[73] Assignee: Borg-Warner Corporation, Chicago, Ill.

[21] Appl. No.: 18,372

[22] Filed: Mar. 7, 1979

[51] Int. Cl.$^2$ .............................................. B01J 23/46
[52] U.S. Cl. ................................... 252/447; 252/428; 252/429 R; 252/430; 252/460; 252/466 PT; 252/474; 585/269; 585/250
[58] Field of Search .................. 252/429 R, 428, 430, 252/447, 460, 466 PT, 474

[56] References Cited

U.S. PATENT DOCUMENTS

| 3,197,418 | 7/1965 | Maebashi et al. | 252/474 X |
|---|---|---|---|
| 3,759,838 | 9/1973 | Dewhirst | 252/429 R |
| 4,021,374 | 5/1977 | Petró et al. | 252/447 X |
| 4,152,303 | 5/1979 | Cohen et al. | 252/474 |

FOREIGN PATENT DOCUMENTS 2117439 10/1971 Fed. Rep. of Germany.

OTHER PUBLICATIONS

Ten Hoedt et al, J. Organomet. Chem. 133 (1977), pp. 113-121.
Popov et al, C.A. 84, 73771w.
Alchudzhan et al, C.A. 71, 12280v.
Alchudzhan et al, C.A. 72, 66452s.
Popov et al, C.A. 77, 18935h.
Van Koten et al, J. Organomet. Chem. 1975, 85 (1), pp. 105-114.

Primary Examiner—Patrick Garvin
Attorney, Agent, or Firm—Joseph Shekleton

[57] ABSTRACT

A process for the preparation of novel zero-valent mixed catalysts. The catalysts are prepared by the reaction of an organic metal cluster compound wherein one of the metals is lithium with a complex of a rhodium halide and an olefinic hydrocarbon ligand. The catalyst may, if desired, be deposited on a support such as alumina or silica. It is effective to catalyze the hydrogenation of organic compounds such as benzene, styrene and the like.

13 Claims, No Drawings

ZERO-VALENT MIXED METAL CATALYSTS AND PROCESS OF PREPARATION

The invention of this application relates to a novel catalyst and its method of preparation. More particularly, it relates as indicated to a zero-valent mixed metal catalyst; the catalyst is effective to promote the hydrogenation of aromatic, olefinic and acetylenic compounds, as well as other reactions normally susceptible to catalysis.

Ten Hoedt et al., J. Organomet. Chem. 133 (1977) 133-121, show the preparation of certain mixed-organocopper cluster compounds by the ligand substitution reaction of $Ar_4Cu_6Br_2$ with two equivalents of LiC-CR.

Popov et al., C.A. 84: 73771w, suggest that the effectiveness of a rhodium-alumina catalyst in the hydrogenation of benzene is directly proportional to the proportion of rhodium in the catalyst. The temperature of the hydrogenation ranged from 100° C. to 160° C.

Alchudzhan et al., C.A. 71: 12280v, studied the temperature dependence of the rate of benzene hydrogenation on a rhodium/silica catalyst. The activity was studied at 200° C., 160° C., 140° C., 115° C., 90°0 C. and 70° C. The activity-temperature curve showed a maximum at 110° C. Also, the activity of Group VIII metals was shown to decrease in the series rhodium>ruthenium->platinum>palladium.

Alchudzhan et al., C.A. 72: 66452s, show the catalysis of benzene hydrogenation by a silver rhodium mixture and also by a rhodium gold mixture.

Bryce-Smith et al., Ger. Offen. No. 2,117,439, show the preparation of improved transistion metal catalysts by treating a salt of the metal with the adduct of an aromatic compound and an alkali metal or alkaline earth metal (other than magnesium).

Popov et al., C.A. 77: 18935h, show the hydrogenation of benzene in the presence of several mixed catalysts including platinum-ruthenium, rhodium-ruthenium, platinum-palladium, palladium-rhodium and platinum-rhodium. At 160° C., the most effective catalyst was found to be a 90:10 palladium-ruthenium mixture.

Van Koten et al., J. Organomet. 1975, 85(1) 105-14, propose an organic copper cluster structure which is polymeric in nature.

The preparation of zero-valent mixed metal catalysts from aromatic metal cluster compounds is shown in copending application Ser. No. 827,278, filed Aug. 24, 1977 now U.S. Pat. No. 4,152,303.

The invention of the present application is a process for the preparation of a zero-valent mixed metal catalyst comprising reacting an organic metal cluster compound wherein one of the metals of said cluster compound is lithium, with a metal halide complex of the formula $RhX_aL_b$ wherein X is chlorine or bromine, L is an olefinic hydrocarbon ligand, a is 1-3 and b is 1-4, in a hydrocarbon solvent. The invention also includes the zero-valent mixed metal catalyst thus prepared. These zero-valent mixed metal catalysts are useful in the catalysis of hydrogenation reactions. The process preferably is carried out in a dry, oxygen-free atmosphere. The atmosphere may be, e.g., nitrogen, ethylene or argon.

The metal cluster compound also contains, in addition to lithium, a Group IB metal. Gold is preferred although silver and copper are also quite satisfactory. A third metal may in some instances be present also. Thus, a metal cluster compound may contain lithium, and two different Group IB metals; other metals may also be present although in the more usual cases only two metals will be present, one being lithium and the other a Group IB metal. The composition of the metal cluster compound may be shown by the formula $R_{x+y}M_xLi_y$ where R is alkyl of 1-12 carbon atoms, M is a Group IB metal, x and y are 1-4 and x+y is 2-8. Preferably, x+y is 4, and x=y=2.

The metal halide complex is as indicated a rhodium halide complex. The halide may as indicated be chlorine or bromine. Chlorine is preferred. The olefinic hydrocarbon ligand is construed broadly; specific illustrative embodiments include ethylene, 1,5-cyclooctadiene, 1,4-norbornadiene, butene-1 and hexene-1. Olefinic hydrocarbons having up to 12 carbon atoms are contemplated.

Examples of metal halide complexes include $RhCl(CH_2=CH_2)_2$, RhBr.cyclooctadiene, RhCl.norbornadiene, etc.

The process is carried out very simply, merely by mixing the reactants at room temperature, i.e., from about 20° C. to about 30° C. A reaction occurs at once. The zero-valent metal product may be used as such in a catalytic hydrogenation, or it may be deposited on a support and isolated by decanting the hydrocarbon solvent away from the solid product. The support may be any of those commonly used in catalytic chemistry, viz., alumina, silica, clay and the like.

The process is carried out in a solvent. The reactants may not be completely soluble in the solvent, and the zero-valent mixed metal product is not soluble, so that agitation of the process mixture is highly desirable. Suitable solvents include benzene, toluene, xylene, ethylbenzene, pentane, cyclohexane and, in fact, any hydrocarbon solvent which is normally liquid, i.e., liquid at about room temperature.

The reaction of the process is illustrated by the following equation:

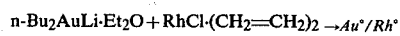

$$n\text{-}Bu_2AuLi\cdot Et_2O + RhCl\cdot(CH_2=CH_2)_2 \rightarrow Au^\circ/Rh^\circ$$

It will be noted that rhodium is one of the metals of the zero-valent mixed metal catalyst herein.

The hydrogenation reactions which are catalyzed by the zero-valent metal products herein may in most instances be carried out at room temperature and at ordinary pressures. Aromatic compounds, i.e., the aromatic ring, can be hydrogenated merely by introducing hydrogen into a reaction vessel containing the aromatic compound and the catalyst. Benzene and naphthalene, for example, can be hydrogenated in this fashion, benzene yielding cyclohexane and naphthalene yielding a mixture of cis- and trans-decalin. Olefinic compounds can also be hydrogenated under similar conditions. Styrene, for example, can be converted to ethylbenzene and then to ethylcyclohexane. Stilbene can be converted to 1,2-diphenylethane and then to 1,2-dicyclohexlethane. Phenylacetylene can be hydrogenated likewise to ethylbenzene, and then to ethylcyclohexane.

The zero-valent mixed metal catalysts of the present invention are characterized by unusual catalytic effectiveness in hydrogenation reactions. They are more effective, for example, than the zero-valent catalysts prepared by the process described in U.S. application Ser. No. 827,278, filed Aug. 24, 1977, now U.S. Pat. No. 4,152,303. In that process an aromatic metal cluster compound is used as the reactant source of the Group IB metal instead of the aliphatic metal cluster compound of the present process.

The organic metal cluster compounds may be prepared by known methods. An alkyl lithium compound such as n-butyllithium is reacted with half an equivalent amount of cuprous halide, for example, to form a metal cluster product whose composition is indicated by the formula $R_4Cu_2Li_2$. The R, which represents n-butyl in such a metal cluster compound, for example, may also be methyl, ethyl, n-propyl, sec-butyl, isobutyl, tert-butyl, n-pentyl, n-hexyl, 2-methylpentyl, 2-ethylhexyl, n-decyl, etc. The method of preparation is illustrated by Example 1.

EXAMPLE 1

To a stirred suspension of 4.94 g. (10 mmols) of gold chloride-triphenylphosphine complex $(AuCl \cdot P(Ph)_3)$ in 100 ml. of pentane containing about 1.1 g. (15 mmols) of diethylether, there is added 1.28 g. (20 mmols) of n-butyllithium. The reaction mixture develops a yellow color and a white precipitate forms. The mixture is chilled to $-80°$ C. and the yellow liquid is decanted from the solid; the solid is identified by its 'H-NMR spectrum in $C_6D_6$ as triphenylphosphine. The yellow pentane solution is evaporated at $50°$ C/0.1 mm. Hg, yielding a yellow-brown oil. Its 'H-NMR spectrum in $C_6D_6$ shows butyl and ether signals in a 2:1 ratio, which is consistent with the structure of the orgaic metal cluster compound $n-Bu_2AuLi \cdot Et_2O$. This product is thus isolated in a 98% yield. It is sensitive to hydrolysis and towards oxidation.

The process by which the mixed metal catalysts of the present invention may be prepared utilizes a metal cluster compound such as that prepared by the procedure of Example 1 as a starting material. An illustrative embodiment is shown in Example 2.

EXAMPLE 2

To a 0.5 M solution in benzene of 391 mg. (1 mmol) of di-n-butylgoldlithium monoetherate $(Bu_2AuLi \cdot et_2O)$ under nitrogen, there is added 194 mg. (1 mmol) of rhodium chloride-ethylene complex $(RhCl \cdot (CH_2=CH_2)_2)$. A metallic deposit, $Au°/Rh°$, is formed almost at once. Its effectiveness as a hydrogenation catalyst is determined by hydrogenating benzene to cyclohexane at room temperature and atmospheric pressure. Under these conditions the above $Au° Rh°$ material causes the hydrogenation to proceed at the rate of 1.6 mmol/min/mmol of catalyst.

A similar $Au°/Rh°$ prepared from an aromatic metal cluster compound, viz., $(p-tol)_4Au_2Li_2 \cdot (Et_2O)_2$, causes the hydrogenation of benzene to proceed under identical conditions at a rate of 0.7 mmol/min/mmol of catalyst.

A similar $Au°/Rh°$ prepared by the process of this invention, but from a rhodium chloride-cyclooctadiene complex rather than the rhodium chloride-ethylene complex of the above example, showed the identical catalytic effectiveness, i.e., a hydrogenation rate of 1.6 mmol/min/mmol of catalyst.

Naphthalene, stilbene, styrene, phenylacetylene and other aromatic, olefinic and acetylenic compounds may be hydrogenated similarly.

All parts and percentages herein are by weight unless otherwise expressly stated.

We claim:

1. A process for the preparation of a zero-valent mixed metal catalyst comprising reacting an organic metal cluster compound conforming to the formula $R_{x+y}M_xLi_y$ where R is alkyl of 1–12 carbon atoms, M is a Group IB metal, x and y are each 1–4, and x+y is 2–8, with a rhodium halide complex of the formula $RhX_aL_b$ where X is chlorine or bromine, L is an olefinic hydrocarbon ligand, a is 1–3 and b is 1–4, in a hydrocarbon solvent.

2. The process of claim 1 wherein R is a butyl group.

3. The process of claim 1 wherein the organic metal cluster compound is reacted with the rhodium halide complex at approximtely room temperature.

4. The process of claim 1 wherein the rhodium halide complex is a rhodium chloride.

5. The process of claim 1 wherein the hydrocarbon solvent is benzene.

6. The process of claim 1 wherein the reaction mixture is substantially free of oxygen.

7. The process of claim 1 wherein the reaction mixture is substantially free of moisture.

8. The process of claim 1 wherein the zero-valent rhodium catalyst is deposited on a carrier.

9. The process of claim 8 wherein the carrier is silica, alumina or carbon.

10. The process of claim 1 wherein M in the structural formula of the organic metal cluster compound is gold.

11. The product of the process of claim 1.

12. The product of the process of claim 2.

13. The product of the process of claim 10.

* * * * *